(12) United States Patent
Harada

(10) Patent No.: US 9,120,470 B2
(45) Date of Patent: Sep. 1, 2015

(54) VEHICLE BRAKE HYDRAULIC PRESSURE CONTROLLER

(71) Applicant: NISSIN KOGYO CO., LTD., Nagano (JP)

(72) Inventor: Yutaka Harada, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 18 days.

(21) Appl. No.: 13/852,090

(22) Filed: Mar. 28, 2013

(65) Prior Publication Data

US 2013/0261923 A1   Oct. 3, 2013

(30) Foreign Application Priority Data

Mar. 28, 2012   (JP) .................. 2012-073691

(51) Int. Cl.
| | |
|---|---|
| *B60T 7/12* | (2006.01) |
| *G05D 1/00* | (2006.01) |
| *G06F 7/00* | (2006.01) |
| *G06F 17/00* | (2006.01) |

(Continued)

(52) U.S. Cl.
CPC ............ *B60T 8/1761* (2013.01); *B60T 7/12* (2013.01); *B60T 8/175* (2013.01); *B60T 8/17616* (2013.01); *B60T 2201/03* (2013.01); *B60T 2201/06* (2013.01)

(58) Field of Classification Search
CPC ......... B60T 7/12; B60T 8/175; B60T 8/1761; B60T 8/17616; B60T 2201/03; B60T 2201/06

USPC ........................................................ 701/78
See application file for complete search history.

(56) References Cited

U.S. PATENT DOCUMENTS 4,765,691 A * 8/1988 Inoue et al. ................ 303/117.1
4,852,950 A * 8/1989 Murakami .................... 303/192

(Continued)

FOREIGN PATENT DOCUMENTS

| JP | 10203329 A | 8/1998 |
|---|---|---|
| JP | 2004203110 A | 7/2004 |

(Continued)

OTHER PUBLICATIONS

Japanese Office Action for related JP Application No. 2012-073691, drafted on Mar. 6, 2014, issued on Mar. 11, 2014, 5 pages.

*Primary Examiner* — Y. Beaulieu
*Assistant Examiner* — Lail Kleinman
(74) *Attorney, Agent, or Firm* — Andrew M. Calderon; Roberts Mlotkowski Safran & Cole, P.C.

(57) ABSTRACT

An embodiment provides a vehicle brake hydraulic pressure controller capable of carrying out a brake hydraulic pressure control in a plurality of control modes depending on a situation of a vehicle. The vehicle brake hydraulic pressure controller includes: proportional solenoid valves provided in passages connecting a master cylinder and wheel brakes of the vehicle, and configured to be controlled at preset drive frequencies; a control mode selecting section configured to select, in the case that two or more control modes are requested simultaneously, one of the two or more requested control modes; and a frequency selecting section configured to select one of the drive frequencies correspondingly with the one of the two or more requested control modes selected by the control mode selecting section.

20 Claims, 5 Drawing Sheets

(51) Int. Cl.
 *B60T 8/1761* (2006.01)
 *B60T 8/175* (2006.01)

(56) References Cited

U.S. PATENT DOCUMENTS

| | | | | |
|---|---|---|---|---|
| 4,950,027 A * | 8/1990 | Reinartz et al. | ............ | 303/113.3 |
| 5,538,336 A * | 7/1996 | Reuter et al. | ............... | 303/119.2 |
| 5,799,261 A * | 8/1998 | Ozaki et al. | ...................... | 701/78 |
| 5,855,417 A * | 1/1999 | Johnston et al. | .................. | 303/3 |
| 5,863,105 A * | 1/1999 | Sano | ........................... | 303/146 |
| 5,916,062 A * | 6/1999 | Siepker | ........................ | 477/194 |
| 5,978,725 A * | 11/1999 | Kagawa | ........................ | 701/70 |
| 6,010,198 A * | 1/2000 | Nakazawa | ................ | 303/113.1 |
| 6,026,343 A * | 2/2000 | Ogino | ............................ | 701/72 |
| 6,064,931 A * | 5/2000 | Sawada et al. | .................. | 701/41 |
| 6,078,858 A * | 6/2000 | Tozu et al. | ...................... | 701/79 |
| 6,089,678 A * | 7/2000 | Mortimer | .................. | 303/113.4 |
| 6,164,731 A * | 12/2000 | Nakazawa et al. | ......... | 303/116.1 |
| 6,199,964 B1 * | 3/2001 | Ota et al. | ..................... | 303/192 |
| 6,260,934 B1 * | 7/2001 | Lee | ................................ | 303/192 |
| 6,278,929 B1 * | 8/2001 | Tozu et al. | ...................... | 701/70 |
| 6,283,561 B1 * | 9/2001 | Shimizu | ....................... | 303/155 |
| 6,364,436 B1 * | 4/2002 | Sawada | ........................ | 303/191 |
| 6,459,978 B2 * | 10/2002 | Taniguchi et al. | .............. | 701/51 |
| 6,517,171 B2 * | 2/2003 | Oshiro et al. | ................. | 303/113.5 |
| 6,533,368 B2 * | 3/2003 | Nishio et al. | ................... | 303/140 |
| 6,672,683 B1 * | 1/2004 | Stumpe et al. | ................... | 303/3 |
| 6,755,486 B2 * | 6/2004 | Nishio et al. | ................. | 303/114.3 |
| 7,000,998 B2 * | 2/2006 | Hano et al. | .................... | 303/191 |
| 7,108,633 B2 * | 9/2006 | Hasegawa et al. | ............. | 477/70 |
| 7,475,953 B2 * | 1/2009 | Osborn et al. | ................. | 303/125 |
| 7,497,523 B2 * | 3/2009 | Fulks et al. | ..................... | 303/3 |
| 7,600,827 B2 * | 10/2009 | Tamai et al. | ................... | 303/191 |
| 8,079,649 B2 * | 12/2011 | Eberling | ...................... | 303/9.76 |
| 8,444,230 B2 * | 5/2013 | Ikematsu et al. | .............. | 303/156 |
| 8,480,185 B2 * | 7/2013 | Itoh | .............................. | 303/192 |
| 8,506,022 B2 * | 8/2013 | Nakaoka et al. | ........... | 303/115.4 |
| 8,532,906 B2 * | 9/2013 | Lu et al. | ......................... | 701/94 |
| 8,579,765 B2 * | 11/2013 | Yu et al. | ......................... | 477/184 |
| 2001/0004723 A1 * | 6/2001 | Nishiyama | ..................... | 701/79 |
| 2001/0022468 A1 * | 9/2001 | Tozu et al. | ................. | 303/113.1 |
| 2001/0041958 A1 * | 11/2001 | Oshiro et al. | ................. | 701/69 |
| 2001/0048243 A1 * | 12/2001 | Nakano | ...................... | 303/117.1 |
| 2001/0049574 A1 * | 12/2001 | Taniguchi et al. | .............. | 701/51 |
| 2002/0014379 A1 * | 2/2002 | Oka et al. | ................... | 188/151 R |
| 2002/0022918 A1 * | 2/2002 | Nakano | ......................... | 701/70 |
| 2002/0027388 A1 * | 3/2002 | Tanaka et al. | ................. | 303/150 |
| 2002/0041124 A1 * | 4/2002 | Nishio et al. | .................. | 303/167 |
| 2002/0043874 A1 * | 4/2002 | Nishio et al. | ................. | 303/114.1 |
| 2002/0063469 A1 * | 5/2002 | Nishio | ............................. | 303/4 |
| 2002/0074856 A1 * | 6/2002 | Suzuki et al. | .................. | 303/166 |
| 2002/0096936 A1 * | 7/2002 | Ishida et al. | ................. | 303/114.1 |
| 2002/0140285 A1 * | 10/2002 | Baumgartner et al. | .... | 303/119.1 |
| 2002/0173391 A1 * | 11/2002 | Endo et al. | ...................... | 474/18 |
| 2002/0185912 A1 * | 12/2002 | Fukami | ...................... | 303/114.3 |
| 2003/0080615 A1 * | 5/2003 | Riddiford et al. | ............. | 303/155 |
| 2003/0154014 A1 * | 8/2003 | Iwata et al. | ..................... | 701/93 |
| 2004/0017106 A1 * | 1/2004 | Aizawa et al. | ................. | 303/191 |
| 2004/0040298 A1 * | 3/2004 | Kobayashi | ....................... | 60/533 |
| 2004/0178675 A1 * | 9/2004 | Kamiya et al. | ................. | 303/191 |
| 2004/0231951 A1 * | 11/2004 | Hasegawa et al. | ............ | 192/220 |
| 2005/0015192 A1 * | 1/2005 | Kato et al. | ....................... | 701/70 |
| 2005/0016168 A1 * | 1/2005 | Singh | ............................... | 60/413 |
| 2005/0020403 A1 * | 1/2005 | Hasegawa et al. | ............... | 477/92 |
| 2005/0029857 A1 * | 2/2005 | Inoue | ............................... | 303/11 |
| 2005/0057096 A1 * | 3/2005 | Kudo | .............................. | 303/155 |
| 2006/0000208 A1 * | 1/2006 | Teslak et al. | .................... | 60/414 |
| 2006/0000659 A1 * | 1/2006 | Teslak et al. | .................. | 180/307 |
| 2006/0017322 A1 * | 1/2006 | Kojima et al. | ................. | 303/139 |
| 2006/0061211 A1 * | 3/2006 | Ohsaki et al. | ................ | 303/113.4 |
| 2006/0066146 A1 * | 3/2006 | Otomo | .......................... | 303/151 |
| 2006/0108868 A1 * | 5/2006 | Ohsaki et al. | ................. | 303/154 |
| 2007/0007817 A1 * | 1/2007 | Nonaga et al. | ................. | 303/155 |
| 2007/0228823 A1 * | 10/2007 | Kokubo et al. | ................. | 303/155 |
| 2007/0267915 A1 * | 11/2007 | Shimada et al. | ................ | 303/122 |
| 2008/0106143 A1 * | 5/2008 | Yazaki et al. | ..................... | 303/13 |
| 2008/0136251 A1 * | 6/2008 | Lee | ............................ | 303/113.2 |
| 2008/0174172 A1 * | 7/2008 | Cannata | ........................... | 303/10 |
| 2008/0203812 A1 * | 8/2008 | Niino et al. | ....................... | 303/10 |
| 2008/0210497 A1 * | 9/2008 | Jeon | ............................... | 188/72.1 |
| 2008/0276606 A1 * | 11/2008 | Petre | .............................. | 60/413 |
| 2008/0295506 A1 * | 12/2008 | Saito et al. | ....................... | 60/390 |
| 2008/0296967 A1 * | 12/2008 | Mori et al. | ........................ | 303/11 |
| 2008/0300763 A1 * | 12/2008 | Mori et al. | ....................... | 701/70 |
| 2009/0077963 A1 * | 3/2009 | Ganzel | ............................ | 60/562 |
| 2009/0096280 A1 * | 4/2009 | Yamanao et al. | ............... | 303/11 |
| 2009/0105918 A1 * | 4/2009 | Kobayashi et al. | ............ | 701/67 |
| 2009/0230762 A1 * | 9/2009 | Giers et al. | ......................... | 303/3 |
| 2010/0029440 A1 * | 2/2010 | Burns et al. | .................... | 477/171 |
| 2010/0066164 A1 * | 3/2010 | Kokubo | ........................... | 303/191 |
| 2010/0071362 A1 * | 3/2010 | Alaze et al. | ...................... | 60/581 |
| 2010/0076659 A1 * | 3/2010 | Nishio et al. | ..................... | 701/78 |
| 2010/0204872 A1 * | 8/2010 | Ishikawa et al. | ................ | 701/29 |
| 2011/0066341 A1 * | 3/2011 | Ohtsu | ............................... | 701/65 |
| 2011/0082633 A1 * | 4/2011 | Kaster | .............................. | 701/83 |
| 2011/0089756 A1 * | 4/2011 | Hirose | ......................... | 303/119.1 |
| 2011/0248559 A1 * | 10/2011 | Vollert et al. | ....................... | 303/3 |
| 2011/0266106 A1 * | 11/2011 | Suzuki | ........................... | 188/360 |
| 2011/0278113 A1 * | 11/2011 | Nishimura et al. | ........ | 188/106 P |
| 2011/0304198 A1 * | 12/2011 | Cottrell, V | ......................... | 303/2 |
| 2011/0316327 A1 * | 12/2011 | Rekow et al. | ...................... | 303/3 |
| 2011/0320067 A1 * | 12/2011 | Ishikawa et al. | .................. | 701/2 |
| 2014/0014451 A1 * | 1/2014 | Nakata et al. | .................. | 188/358 |

FOREIGN PATENT DOCUMENTS

| | | | | |
|---|---|---|---|---|
| JP | 2006290024 | | 10/2006 | |
| JP | 2010064678 A | | 3/2010 | |
| KR | 2007063782 A | * | 6/2007 | ............... B60T 8/58 |

\* cited by examiner

FIG. 4

| STATE OF VEHICLE | CONTROL MODE | REQUIRED CURRENT | LIKELIHOOD | DRIVE FREQUENCY |
|---|---|---|---|---|
| STOP | CAS | SMALL | HIGH | HIGH FREQUENCY |
| | HSA | LARGE | LOW | INTERMEDIATE FREQUENCY |
| TRAVELING | TCS | SMALL | LOW | LOW FREQUENCY |
| | AYC | LARGE | LOW | LOW FREQUENCY |
| | BA | LARGE | LOW | LOW FREQUENCY |
| | TCS+BA | LARGE | LOW | LOW FREQUENCY |
| | AYC+BA | LARGE | LOW | LOW FREQUENCY |

VEHICLE BRAKE HYDRAULIC PRESSURE CONTROLLER

CROSS-REFERENCE TO RELATED APPLICATION(S)

This application claims priority (priorities) from Japanese Patent Application No. 2012-073691 filed on Mar. 28, 2012, the entire contents of which are incorporated herein by reference.

FIELD

The present invention relates to a vehicle brake hydraulic pressure controller, more particularly, to a vehicle brake hydraulic pressure controller having plural functions, such as skid suppression control, traction control, brake assist control and brake force holding control.

BACKGROUND

JP-2006-290024-A discloses a vehicle brake hydraulic pressure controller having functions for skid suppression control and traction control. There may also be a controller further having numerous functions, such as functions for brake assist control and brake force holding control during vehicle stop.

The above-mentioned various functions may be respectively carried out in different situations. For example, when the vehicle stops, operation noise generated during the control is conspicuous because there is no road noise, and the noise is requested to be low. However, generally speaking, when brake hydraulic pressure control is performed, proportional solenoid valves are driven at constant drive frequency, regardless of the situation of the vehicle. Hence, when brake control is performed during vehicle stop in the case that the drive frequency is low, unpleasant noise is likely to be transmitted to the ears of the driver and passengers.

SUMMARY

An aspect of the present invention provides a vehicle brake hydraulic pressure controller capable of carrying out a brake hydraulic pressure control in a plurality of control modes depending on a situation of a vehicle, including:

proportional solenoid valves provided in passages connecting a master cylinder and wheel brakes of the vehicle, and configured to be controlled at preset drive frequencies, the drive frequencies being set correspondingly with the control modes such that the drive frequency for the control mode in a vehicle stopping state is higher than the drive frequency for the control mode in a vehicle traveling state;

a control mode selecting section configured to select, in the case that two or more control modes are requested simultaneously, one of the two or more requested control modes based on a magnitude of a control pressure of each requested control mode; and a frequency selecting section configured to select one of the drive frequencies correspondingly with the one of the two or more requested control modes selected by the control mode selecting section.

With this configuration, in the case that two or more control modes are requested simultaneously, one control mode is selected on the basis of the magnitude of the control pressure of each requested control mode, whereby brake hydraulic pressure control can be carried out at optimal control pressure. One of the drive frequencies individually set so as to correspond to the plural control modes is selected on the basis of the selected one control mode, whereby control optimally suited for the proportional solenoid valves and corresponding to each control mode can be carried out. In particular, in the case that the selected control mode is of the vehicle stopping state, drive frequency higher than that in a mode in the vehicle traveling state is selected, whereby unpleasant noise can be suppressed from being transmitted from the proportional solenoid valves to the ears of the driver and passengers. In the vehicle traveling state, since noise from the proportional solenoid valves is difficult to be heard due to road noise, no unpleasant feeling will be given.

There may be further provided the vehicle brake hydraulic pressure controller, wherein the control mode in the vehicle stopping state includes a first vehicle-stop holding mode requested on an uphill road and a second vehicle-stop holding mode requested during an engine idling stop, and wherein the drive frequency in the second vehicle-stop holding mode is set higher than that in the first vehicle-stop holding mode.

With this configuration, among the modes in the vehicle stopping state, the drive frequency in the second vehicle-stop holding mode more likely to be requested is made higher than the drive frequency in the first vehicle-stop holding mode, whereby the chances of giving an unpleasant feeling to the driver and passengers can be reduced. Furthermore, the drive frequency in the first vehicle-stop holding mode requested on an uphill road is made lower than the drive frequency in the second vehicle-stop holding mode, whereby the responsiveness of the proportional solenoid valves can be raised. As a result, for example, when the driver depresses the brake pedal further on an uphill road, the brake hydraulic pressure can be increased promptly by the proportional solenoid valves having high responsiveness.

There may be further provided the vehicle brake hydraulic pressure controller, wherein, in the case that the first vehicle-stop holding mode and the second vehicle-stop holding mode are requested simultaneously, the control mode selecting section selects either mode having higher control pressure.

With this configuration, either mode having higher control pressure is selected, whereby both the control requests (control pressures) of the two modes can be satisfied.

There may be further provided the vehicle brake hydraulic pressure controller, wherein the control mode in the vehicle traveling state includes a skid suppression control mode in which a skidding of the vehicle is detected to be suppressed and a traction control mode in which a racing of at least one wheel is detected to be suppressed, and wherein, in the case that the skid suppression control mode and the traction control mode are requested simultaneously, the control mode selecting section selects either mode having higher control pressure.

With this configuration, either mode having higher control pressure is selected, whereby both the control requests (control pressures) of the two modes can be satisfied.

There may be further provided the vehicle brake hydraulic pressure controller, wherein the control mode in the vehicle traveling state further includes a brake assist control mode in which a braking is assisted by increasing a brake hydraulic pressure upon detection of a sudden braking, and wherein, in the case that the skid suppression control mode, the traction control mode and the brake assist control mode are requested simultaneously, the control mode selecting section:

compares a first control pressure obtained by adding the control pressures in the skid suppression control mode and the brake assist control mode with a second control pressure obtained by adding the control pressures in the traction control mode and the brake assist control mode, selects, in the case that the first control pressure is higher than the second control pressure, a first control mode in which the brake hydraulic pressure control is carried out at the first control pressure, and selects, in the case that the first control pressure is equal to or less than the second control pressure, a second control mode in which brake hydraulic pressure control is carried out at the second control pressure.

With this configuration, the first control mode or the second control mode, whichever has higher control pressure, is selected, whereby both the control requests (control pressures) of the two modes can be satisfied.

With the present invention, in the vehicle brake hydraulic pressure controller capable of carrying out brake hydraulic pressure control in various control modes, the control optimally suited for proportional solenoid valves and corresponding to each control mode can be carried out.

BRIEF DESCRIPTION OF DRAWINGS

FIG. 4 shows drive frequencies individually set for plural control modes.

DETAILED DESCRIPTION

An embodiment will be described referring to the accompanying drawings.

Figure 1:
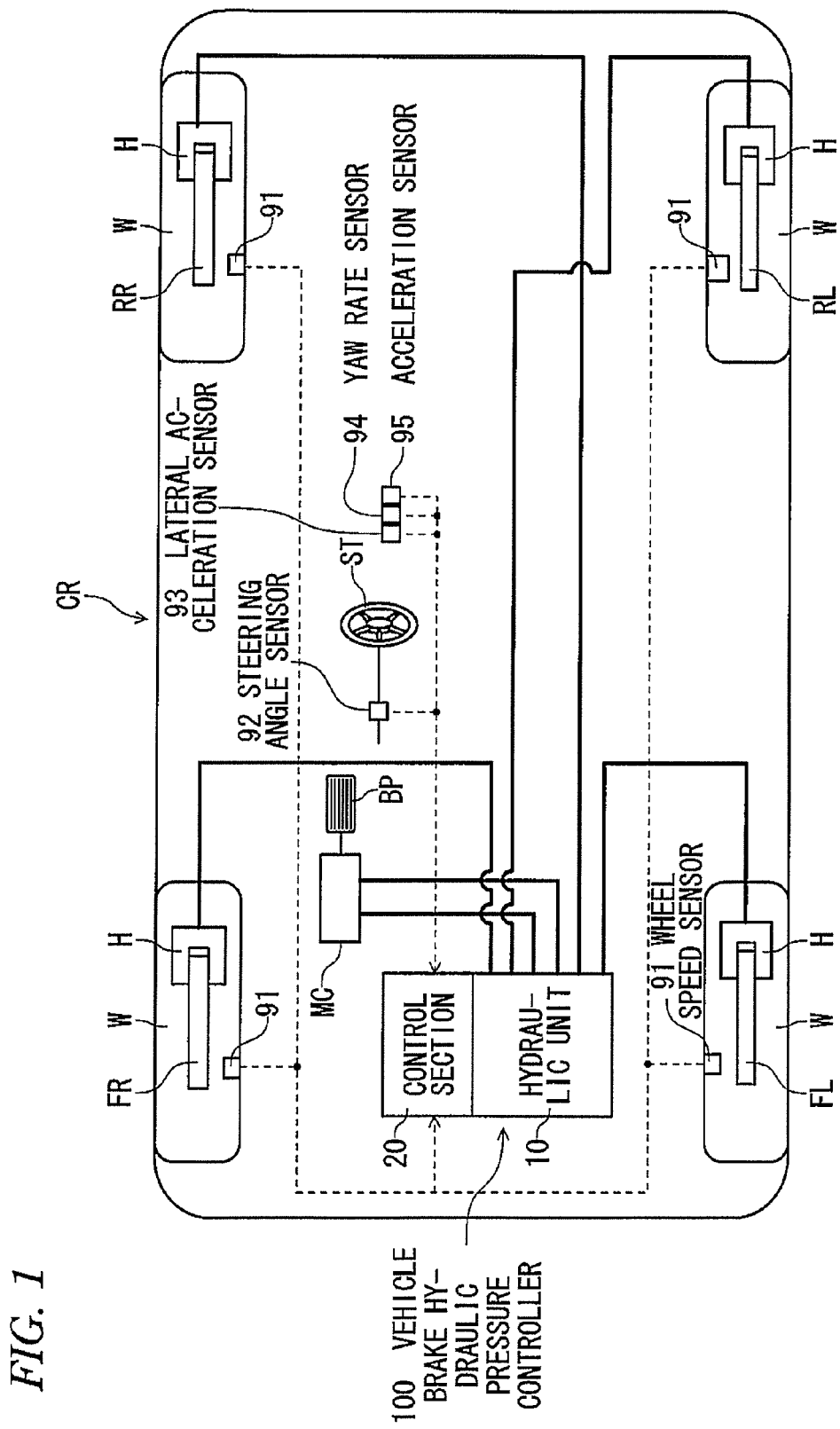
FIG. 1 shows a configuration of a vehicle equipped with a vehicle brake hydraulic pressure controller according to an embodiment.

As shown in FIG. 1, a vehicle brake hydraulic pressure controller 100 is used to appropriately control a brake force (brake hydraulic pressure) applied to each wheel W of a vehicle CR. The vehicle brake hydraulic pressure controller 100 includes a hydraulic unit 10 and a control section 20. The hydraulic unit 10 is provided with hydraulic passages (fluid passages) and various components. The control section 20 controls the various components inside the hydraulic unit 10. Wheel speed sensors 91, a steering angle sensor 92 for detecting the steering angle of a steering wheel ST, a lateral acceleration sensor 93 for detecting an acceleration exerted to the vehicle CR in the lateral direction thereof, a yaw rate sensor 94 for detecting the turning angular velocity of the vehicle CR, and an acceleration sensor 95 for detecting the acceleration of the vehicle CR in the front-rear direction thereof are connected to the control section 20 of the vehicle brake hydraulic pressure controller 100. The detection results of the respective sensors 91 to 95 are output to the control section 20.

For example, the control section 20 includes a CPU, a RAM, a ROM and input/output circuits, and carries out control by performing various kinds of arithmetic processing on the basis of the input from the wheel speed sensors 91, the steering angle sensor 92, the lateral acceleration sensor 93, the yaw rate sensor 94 and the acceleration sensor 95 and also on the basis of programs and data stored in the ROM. Each of wheel cylinders H is a hydraulic device for converting the brake hydraulic pressure generated by a master cylinder MC and the vehicle brake hydraulic pressure controller 100 into the actuating force of each of the wheel brakes FR, FL, RR and RL provided for each wheel W. The wheel cylinders H are respectively connected to the hydraulic unit 10 of the vehicle brake hydraulic pressure controller 100 via pipes.

Figure 2:
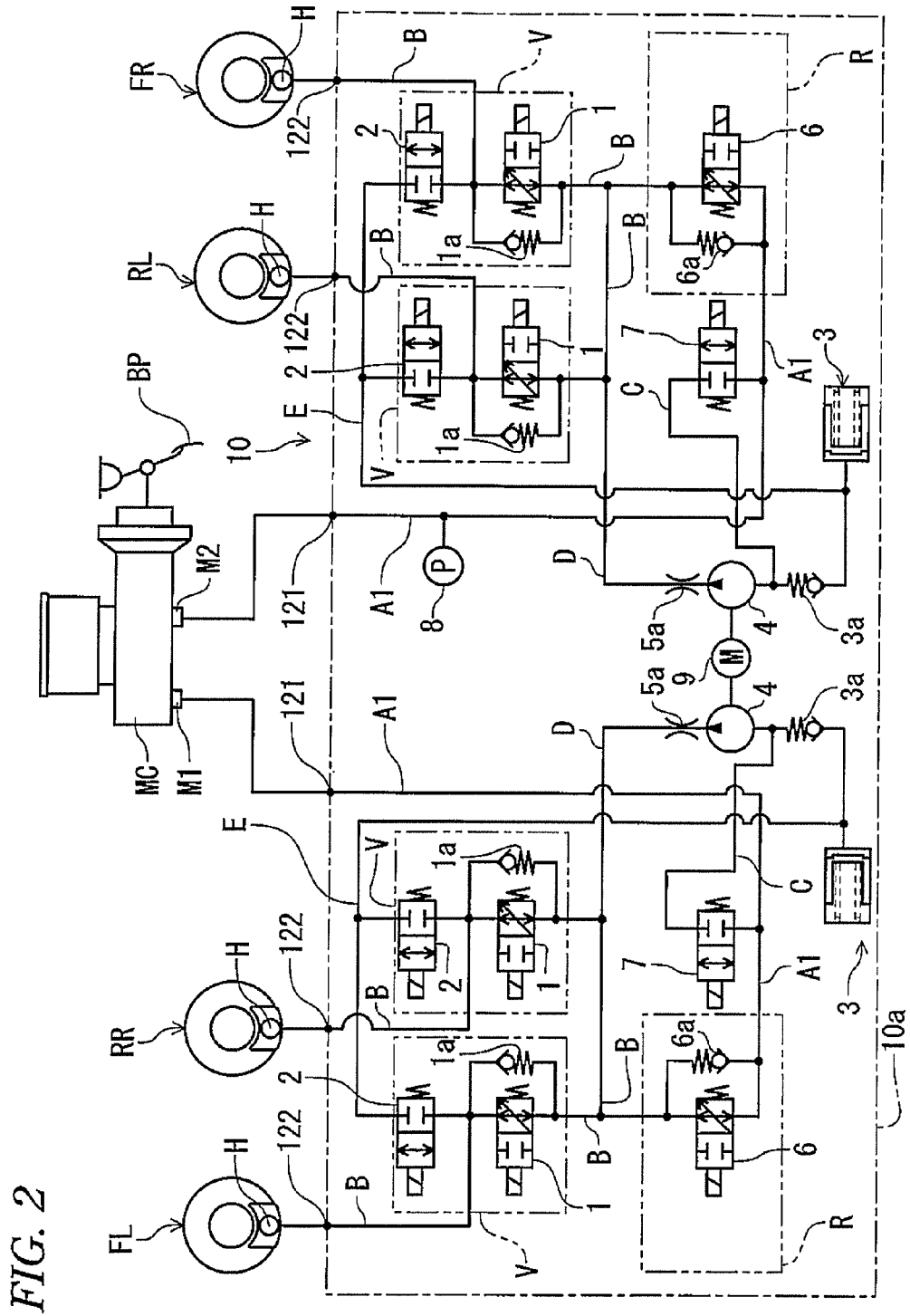
FIG. 2 shows a hydraulic circuit of the vehicle brake hydraulic pressure controller.

As shown in FIG. 2, the hydraulic unit 10 of the vehicle brake hydraulic pressure controller 100 is disposed between the master cylinder (hydraulic pressure source) MC for generating brake hydraulic pressure depending on the depressing force applied to the brake pedal BP of the vehicle by the driver and the wheel brakes FR, FL, RR and RL. The hydraulic unit 10 includes a pump body (base body) 10a having hydraulic passages through which brake fluid flows, plural inlet valves 1 and plural outlet valves 2 disposed in the hydraulic passages, etc. The two output ports M1 and M2 of the master cylinder MC are connected to the inlet ports 121 of the pump body 10a, and the outlet ports 122 of the pump body 10a are respectively connected to the wheel brakes FR, FL, RR and RL. Communication is usually established from the inlet ports 121 to the outlet ports 122 via the hydraulic passages inside the pump body 10a, whereby the depressing force applied to the brake pedal BP is transmitted to each of the wheel brakes FL, RR, RL and FR.

The hydraulic passage starting from the output port M1 leads to the front left wheel brake FL and the rear right wheel brake RR, and the hydraulic passage starting from the output port M2 leads to the front right wheel brake FR and the rear left wheel brake RL. In the following description, the hydraulic passage starting from the output port M1 is referred to as a "first system" and the hydraulic passage starting from the output port M2 is referred to as a "second system."

The first system of the hydraulic unit 10 includes two control valve units V respectively corresponding to the wheel brakes FL and RR. Similarly, the second system thereof includes two control valve units V respectively corresponding to the wheel brakes RL and FR. Each of the first and second systems of the hydraulic unit 10 includes a reservoir 3, a pump 4, an orifice 5a, a regulation valve unit (regulator) R and a suction valve 7. The hydraulic unit 10 includes a common motor 9 for driving the pump 4 of the first system and the pump 4 of the second system. This motor 9 is a motor, the rotation speed of which can be controlled. In this embodiment, the rotation speed of the motor is controlled by duty control. In the embodiment, a pressure sensor 8 is provided only in the second system.

In the following description, the hydraulic passage from the output port M1 of the master cylinder MC to the regulation valve unit R and the hydraulic passage from the output port M2 thereof to the regulation valve unit R are each referred to as an "output hydraulic passage A1." The hydraulic passage from the regulation valve unit R of the first system to the wheel brakes FL and RR and the hydraulic passage from the regulation valve unit R of the second system to the wheel brakes RL and FR are each referred to as a "wheel hydraulic passage B." The hydraulic passage from the output hydraulic passage A1 to the pump 4 is referred to as a "suction hydraulic passage C" and the hydraulic passage from the pump 4 to the wheel hydraulic passage B is referred to as a "discharge hydraulic passage D." The hydraulic passage from the wheel hydraulic passage B to the suction hydraulic passage C is referred to as an "open passage E."

The control valve unit V controls the flow of the brake fluid under pressure between the master cylinder MC or the pump 4 and each of the wheel brakes FL, RR, RL and FR (more specifically, the wheel cylinders H), and can increase, retain or reduce the pressure of the wheel cylinder H. The control valve unit V includes an inlet valve 1, an outlet valve 2 and a check valve 1a.

The inlet valve 1 is a normally-open proportional solenoid valve provided between the master cylinder MC and each of the wheel brakes FL, RR, RL and FR, that is, in the wheel hydraulic passage B. Hence, the pressure difference between the upstream and downstream sides of the inlet valve 1 can be adjusted depending on the value of the drive current applied to in the inlet valve 1.

The outlet valve 2 is a normally-closed solenoid valve provided between each reservoir 3 and each of the wheel brakes FL, RR, RL and FR, that is, between the wheel hydraulic passage B and the open passage E. Although the outlet valve 2 is normally closed, it is opened by the control section 20 when the wheel W is likely to lock, whereby the brake hydraulic pressure exerted to each of the wheel brakes FL, FR, RL and RR is relieved to each reservoir 3.

The check valve 1a is connected in parallel with each inlet valve 1 to allow the brake fluid to flow only from each of the wheel brakes FL, FR, RL and RR to the master cylinder MC. In the case that the input from the brake pedal BP is released, even when the inlet valve 1 is closed, the check valve 1a allows the brake fluid to flow from each of the wheel brakes FL, FR, RL and RR to the master cylinder MC.

The reservoir 3 is provided in the open passage E to temporarily reserve the brake fluid that is relieved when each outlet valve 2 is opened. A check valve 3a is provided between the reservoir 3 and the pump 4 to allow the brake fluid to flow only from the reservoir 3 to the pump 4.

The pump 4 is provided between the suction hydraulic passage C communicating with the output hydraulic passage A1 and the discharge hydraulic passage D communicating with the wheel hydraulic passage B, for sucking the brake fluid reserved in the reservoir 3 and discharging the brake fluid to the discharge hydraulic passage D. As a result, the brake fluid absorbed by the reservoir 3 can be returned to the master cylinder MC. Brake hydraulic pressure is generated regardless of whether the brake pedal BP is operated, whereby a brake force can be generated and exerted to the wheel brakes FL, RR, RL and FR as described later.

The discharge amount of the brake fluid from the pump 4 depends on the rotation speed (duty ratio) of the motor 9. For example, when the rotation speed (duty ratio) of the motor 9 becomes high, the discharge amount of the brake fluid from the pump 4 increases.

The orifice 5a attenuates the pulsation of the pressure of the brake fluid discharged from the pump 4.

The regulation valve unit R normally allows the brake fluid to flow from the output hydraulic passage A1 to the wheel hydraulic passage B. When the pressure on the side of the wheel cylinder H is raised by the brake hydraulic pressure generated by the pump 4, the regulation valve unit R shuts off the flow of the brake fluid to thereby adjust the pressure on the side of the wheel hydraulic passage B and the wheel cylinder H to a preset value or less. The regulation valve unit R includes a change-over valve 6 and a check valve 6a.

The change-over valve 6 is a normally-open proportional solenoid valve provided between the output hydraulic passage A1 communicating with the master cylinder MC and the wheel hydraulic passage B communicating with each of the wheel brakes FL, FR, RL and RR. The valve element of the change-over valve 6 is biased by an electromagnetic force corresponding to the current applied to the valve in the closing direction of the valve, although the details of the valve are not shown in the figure. In the case that the pressure in the wheel hydraulic passage B becomes higher than the pressure in the output hydraulic passage A1 by a predetermined value (this predetermined value is dependent on the applied current) or more, the brake fluid escapes from the wheel hydraulic passage B to the output hydraulic passage A1, whereby the pressure on the side of the wheel hydraulic passage B is adjusted to a predetermined pressure. The force for closing the change-over valve 6 may be changed arbitrarily depending on the value (indicated current value) of a drive current input to the change-over valve 6, whereby the pressure difference between the upstream and downstream sides of the change-over valve 6 is adjusted and the pressure in the wheel hydraulic passage B can be adjusted to the preset value or less.

The check valve 6a is connected in parallel with each change-over valve 6. The check valve 6a is a one-way valve for allowing the brake fluid to flow from the output hydraulic passage A1 to the wheel hydraulic passage B.

The suction valve 7 is a normally-closed solenoid valve provided in the suction hydraulic passage C and is used to switch the suction hydraulic passage C to an open state or a closed state. The suction valve 7 is opened by the control of the control section 20 when the brake hydraulic pressure inside the wheel brakes FL, RR, RL and FR is raised by the pump 4, for example.

The pressure sensor 8 is used to detect the brake hydraulic pressure in the output hydraulic passage A1, and the result of the detection is input to the control section 20.

Next, the details of the control section 20 will be described.

Figure 3:
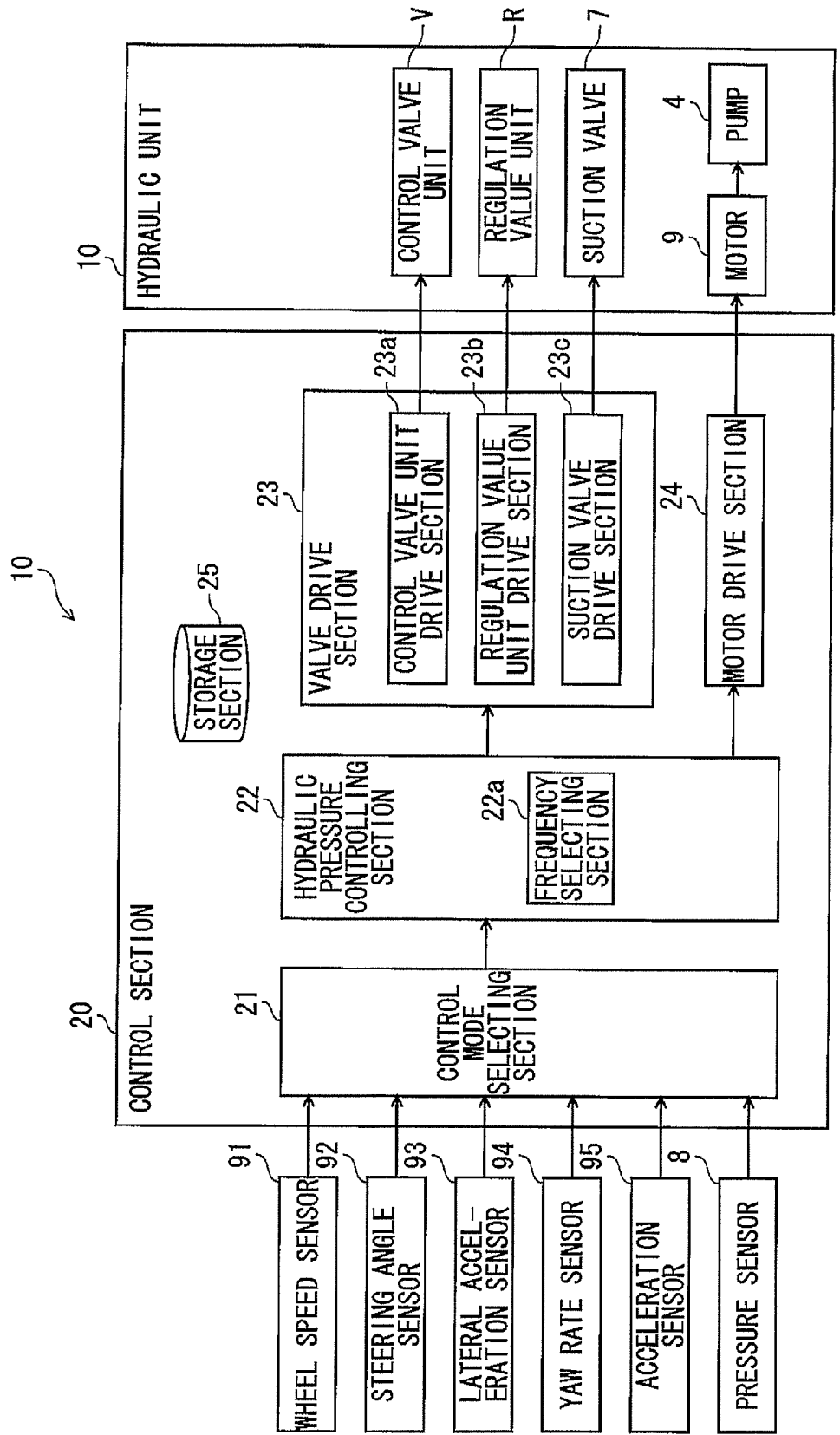
FIG. 3 shows a functional configuration of a control section of the controller.

As shown in FIG. 3, on the basis of signals input from the respective sensors 91 to 95 and 8, the control section 20 controls the opening/closing operations of the control valve units V, the regulation valve units R (change-over valves 6) and the suction valves 7 and also controls the operation of the motor 9, thereby controlling the respective wheel brakes FL, RR, RL and FR. The control section 20 includes a control mode selecting section 21, a hydraulic pressure controlling section 22, a valve drive section 23, a motor drive section 24 and a storage section 25.

On the basis of the signals input from the respective sensors 91 to 95 and 8, the control mode selecting section 21 judges which one of plural control modes is requested. In the case that two or more control modes are requested simultaneously, the control mode selecting section 21 selects one control mode on the basis of the magnitude of the control pressure of each requested control mode. Thus, brake hydraulic pressure control can be carried out at optimal control pressure.

In the embodiment, for the vehicle stopping state, a hill-start assist mode (HSA mode) requested on an uphill road as a first vehicle-stop holding mode and a creep aid system mode (CAS mode) requested during an engine idling stop as a second vehicle-stop holding mode are stored/set in the storage section 25.

For the vehicle traveling state, a skid suppression control mode (active yaw control mode; AYC mode) in which the skidding of the vehicle is detected to be suppressed, a traction control mode (TCS mode) in which the racing of at least one wheel is detected to be suppressed, and a brake assist control mode (BA mode) in which sudden braking by the driver is detected and the braking is assisted by increasing the brake hydraulic pressure are stored/set in the storage section 25. Known methods may be used to judge which control mode is requested.

For example, to judge whether the HSA mode is requested, judgments may be made as to whether the vehicle is in a stopping state and whether the acceleration in the rearward direction is equal to or more than a first threshold value (whether the inclination of an uphill road is equal to or more than a predetermined first inclination) on the basis of the information from the wheel speed sensors 91 and the acceleration sensor 95. To judge whether the CAS mode is requested, judgments may be made as to whether a signal indicating an engine idling stop is input, whether the vehicle is in a stopping state and whether the acceleration in the front-rear direction is equal to or more than a second threshold value (whether the inclination is equal to or more than a predetermined second inclination) on the basis of the information from the wheel speed sensors 91, the acceleration sensor 95 and another controller (ECU), not shown.

To judge whether the AYC mode is requested, for example, the following methods may be performed. First, after the values of the respective sensors are read, a target yaw rate is calculated on the basis of the steering angle and the vehicle speed calculated from the wheel speeds. The target yaw rate may be calculated so as to be equivalent to the yaw rate obtained at the time of neutral steering. Then, on the basis of the actual lateral acceleration detected by the lateral acceleration sensor 93, this target yaw rate is converted into a value (revised target yaw rate) in which the yaw rate value corresponding to the lateral acceleration is used as the upper limit value. And then, the difference (yaw rate deviation) between the revised target yaw rate and the actual yaw rate detected by the yaw rate sensor 94 is calculated. The yaw rate deviation represents the difference between the steering operation by the driver and the actual behavior of the vehicle. In the case that the yaw rate deviation is more than a predetermined threshold value and that the vehicle speed is equal to or more than a third threshold value, it is judged that the vehicle is in a skidding state and that the AYC mode is requested.

To judge whether the TCS mode is requested, a judgment may be made as to whether the racing of at least one wheel has occurred by judging whether the difference between the left and right wheel speeds is equal to or more than a fourth threshold value on the basis of the information from the wheel speed sensors 91. To judge whether the BA mode is requested, on the basis of the information from the wheel speed sensors 91 and the pressure sensor 8, judgments may be made as to whether the vehicle speed is equal to or more than a fifth threshold value, whether the variation of the master cylinder pressure is equal to or more than a sixth threshold value, and whether the master cylinder pressure is in a predetermined range.

In the case it is judged that the HSA mode and the CAS mode are requested simultaneously among the above-mentioned plural control modes, the control mode selecting section 21 selects either mode having higher control pressure. In the case that it is judged that the AYC mode and the TCS mode are requested simultaneously, the control mode selecting section 21 selects either mode having higher control pressure.

As a result, either mode having higher control pressure is always selected, whereby both the control requests (control pressures) of the two modes can be satisfied.

In the case that it is judged that the AYC mode, the TCS mode and the BA mode are requested simultaneously, the control mode selecting section 21 calculates a first control pressure by adding the respective control pressures in the AYC mode and the BA mode, and calculates a second control pressure by adding the respective control pressures in the TCS mode and the BA mode. The control mode selecting section 21 compares the calculated first control pressure with the calculated second control pressure. In the case that the first control pressure is higher than the second control pressure, the control mode selecting section 21 selects a first control mode (YAC+BA mode) in which brake hydraulic pressure control is carried out at the first control pressure. In the case that the first control pressure is equal to or less than the second control pressure, the control mode selecting section 21 selects a second control mode (TCS+BA mode) in which brake hydraulic pressure control is carried out at the second control pressure.

Also in this case, the control mode selecting section 21 selects the first control mode or the second control mode, whichever has higher control pressure, whereby both the control requests (control pressures) of the two modes can be satisfied.

The control mode selecting section 21 then outputs one control mode selected to the hydraulic pressure controlling section 22.

The hydraulic pressure controlling section 22 instructs the valve drive section 23 and the motor drive section 24 to drive the respective valves and the motor 9 so that the brake hydraulic pressure inside the wheel cylinders H becomes equal to the control pressure corresponding to that in the one control mode selected by the control mode selecting section 21. In particular, in the embodiment, the hydraulic pressure controlling section 22 can carry out brake hydraulic pressure control in plural control modes corresponding to the states of the vehicle by controlling the regulation valve units R at preset drive frequencies.

The drive frequencies are stored in the storage section 25, for example, as a table of FIG. 4, and are set individually so as to correspond to the plural control modes. The drive frequencies in the control modes in the vehicle stopping state are set so as to be higher than that in the control modes in the vehicle traveling state.

Hence, in the case that the selected control mode is of the vehicle stopping state, drive frequency (high frequency or intermediate frequency) higher than the drive frequency (low frequency) in the control modes in the vehicle traveling state is selected. For this reason, unpleasant noise can be suppressed from being transmitted from the regulation valve units R to the ears of the driver and passengers. In the vehicle traveling state, since the noise from the regulation valve units R is difficult to be heard due to road noise, no unpleasant feeling will be given even if the drive frequency is low.

In the control modes in the vehicle stopping state, high frequency is set as the drive frequency in the CAS mode more likely to be requested, and intermediate frequency lower than high frequency is set as the drive frequency in the HSA mode less likely to be requested. Hence, unpleasant noise can be suppressed from being generated from the regulation valve units R in the CAS mode having a higher likelihood of being requested, whereby the chances of giving an unpleasant feeling to the driver and passengers can be reduced. The responsiveness of the regulation valve units R in the HAS mode can be made higher than that in the CAS mode by making the drive frequency in the HSA mode lower than that in the CAS mode. As a result, for example, when the driver starts moving the vehicle on an uphill road, a brake dragging feeling can be prevented by promptly reducing the brake hydraulic pressure.

In the CAS mode, a small value of current is sufficient to satisfy the need for the control. For this reason, even when high frequency at which drive elements are liable to be heated is used, the regulation valve units R can be suppressed from being heated to high temperature because of the small value of the current. Since a large value of current is required for control in the HSA mode, intermediate frequency is used at which heat is less generated than at high frequency, whereby the regulation valve units R can be suppressed from being heated to high temperature.

Here, low frequency lower than intermediate frequency is set as the drive frequency in the respective control modes (TCS, AYC, BA, TCS+BA and AYC+BA) in the vehicle traveling state. For example, low frequency may be set in the respective control modes in the vehicle traveling state, regardless of the current value required for control and the likelihood of the control requests. As a result, the responsiveness of the regulation valve units R can be raised in the respective control modes in the vehicle traveling state, whereby the brake hydraulic pressure can be controlled promptly.

Referring again to FIG. 3, the hydraulic pressure controlling section 22 includes a frequency selecting section 22a for selecting one of the drive frequencies having been set as described above. The frequency selecting section 22a selects drive frequency on the basis of one control mode selected by the control mode selecting section 21.

For example, the frequency selecting section 22a selects high frequency as the drive frequency in the case that the CAS mode is selected as one control mode, or selects low frequency as the drive frequency in the case that the TCS+BA mode is selected as one control mode, on the basis of the table of FIG. 4. Among the drive frequencies individually set so as to correspond to the plural control modes, the drive frequency corresponding to the one control mode selected is selected as described above. Hence, the regulation valve units R can be controlled optimally for each control mode.

The valve drive section 23 is a section for controlling the control valve units V, the regulation valve units R and the suction valves 7 on the basis of the instructions of the hydraulic pressure controlling section 22. The valve drive section 23 has a control valve unit drive section 23a, a regulation valve unit drive section 23b and a suction valve drive section 23c.

The control valve unit drive section 23a controls the inlet valve 1 and the outlet valve 2 on the basis of the pressure raising, holding or reducing instructions of the hydraulic pressure controlling section 22. In the case that the pressure in the wheel cylinder H may be raised, no current is applied to the inlet valve 1 and the outlet valve 2. In the case that the pressure in the wheel cylinder H may be reduced, signals are transmitted to both the inlet valve 1 and the outlet valve 2 to close the inlet valve 1 and to open the outlet valve 2, thereby discharging the brake fluid of the wheel cylinder H through the outlet valve 2. In the case that the pressure in the wheel cylinder H is held, a signal is transmitted to the inlet valve 1 and no current is applied to the outlet valve 2, thereby closing both the inlet valve 1 and the outlet valve 2.

The regulation valve unit drive section 23b normally does not apply current to the regulation valve unit R. In the case that a drive instruction is given from the hydraulic pressure controlling section 22, the regulation valve unit drive section 23b applies current to the regulation valve unit R according to this instruction by duty control. When the current is applied to the regulation valve unit R, a pressure difference occurs depending on the current between one side of the regulation valve unit R, i.e., on the side of the master cylinder MC, and on the other side of the regulation valve unit R, i.e., on the side of the control valve unit V. As a result, the hydraulic pressure in the discharge hydraulic passage D between the regulation valve unit R and the control valve unit V is adjusted.

The suction valve drive section 23c normally does not apply current to the suction valve 7. In the case that an instruction is given from the hydraulic pressure controlling section 22, the suction valve drive section 23c outputs a signal to the suction valve 7 according to this instruction. As a result, the suction valve 7 opens and the brake fluid is sucked from the master cylinder MC to the pump 4.

The motor drive section 24 determines the rotation speed of the motor 9 on the basis of an instruction from the hydraulic pressure controlling section 22 and drives the motor 9. Thus, the motor drive section 24 performs rotation speed control to drive the motor 9. In the embodiment, duty control is used to perform rotation speed control.

Next, the operation to be performed when the drive frequency is selected by the control section 20 will be described referring to FIG. 5. The control section 20 repeatedly carries out the processing in the flow chart shown in FIG. 5 at all times.

Figure 5:
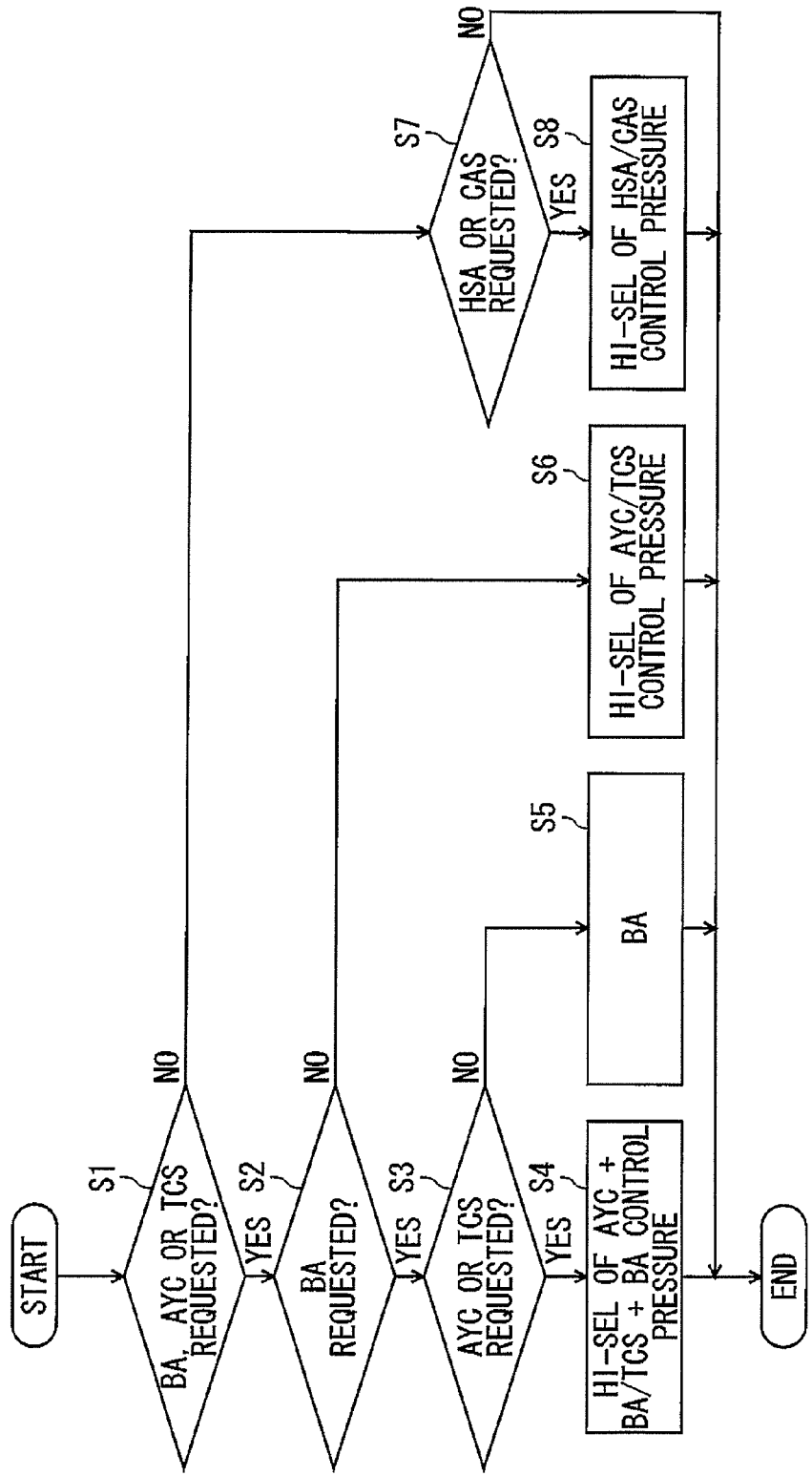
FIG. 5 shows an operation of the control section.

In the control shown in FIG. 5, the control section 20 first judges whether at least one of the BA mode, the AYC mode and the TCS mode is requested (at S1). In other words, at step S1, the control section 20 judges whether a control mode in the vehicle traveling state is requested.

In the case that it is judged that at least one of the respective control modes in the vehicle traveling state is requested (Yes) at step S1, the control section 20 judges whether the BA mode is requested (at S2). In the case that it is judged that the BA mode is requested (Yes) at step S2, the control section 20 further judges whether at least one of the AYC mode and the TCS mode is requested (at S3).

In other words, at step S3, the control section 20 judges whether plural control modes in the vehicle traveling state are requested. In the case that it is judged that at least one of the AYC mode and the TCS mode is requested, that is, plural control modes are requested (Yes) at step S3, the control section 20 selects the AYC+BA mode or the TCS+BA mode, whichever has higher control pressure (HI-SEL) and selects the drive frequency (low frequency) corresponding to the selected control mode from the table of FIG. 4 (at S4).

In the case that one of the AYC mode and the TCS mode (for example, the AYC mode) is requested in addition to the BA mode at step S4, the control pressure in the control mode not requested (for example, the TCS mode) becomes zero. Hence, the control mode (for example the AYC+BA mode) in which the control pressure in the BA mode is added to the control pressure in the requested control mode (for example, the AYC mode) is selected.

In the case that it is judged that neither the AYC mode nor the TCS mode is requested (No) at step S3, the control section 20 selects the BA mode and selects the drive frequency (low frequency) corresponding to the selected BA mode from the table of FIG. 4 (at S5).

In the case that it is judged that the BA mode is not requested (No) at step S2, the control section 20 selects the AYC mode or the TCS mode, whichever has higher control pressure (HI-SEL) and selects the drive frequency (low frequency) corresponding to the selected control mode from the table of FIG. 4 (at S6). In the case that one of the AYC mode and the TCS mode (for example, the AYC mode) is requested at step S6 as in the case of step S4, the control pressure in the control mode not requested (for example, the TCS mode) becomes zero. Hence, the requested control mode (for example the AYC mode) is selected.

In the case that it is judged that none of the respective control modes in the vehicle traveling state is requested (No) at step S1, the control section 20 judges whether at least one of the HSA mode and the CAS mode is requested (at S7). In the case that it is judged that at least one of the HSA mode and the CAS mode is requested (Yes) at step S7, the control section 20 selects the USA mode or the CAS mode, whichever has higher control pressure (HI-SEL) and selects the drive frequency corresponding to the selected control mode from the table of FIG. 4 (at S8).

In the case that one of the HSA mode and the CAS mode (for example, the HSA mode) is requested at step S8 as in the case of step S4, the control pressure in the control mode not requested (for example, the CAS mode) becomes zero. Hence, the requested control mode (for example, the HSA mode) is selected. In the case that the HSA mode is selected at step S8, intermediate frequency is selected as the drive frequency. In the case that the CAS mode is selected, high frequency is selected as the drive frequency.

In the case that it is judged that neither the HSA mode nor the CAS mode is requested (No) at step S7, the control section 20 ends this control.

The present invention is not limited to the above-mentioned embodiment, but can be used in various embodiments.

In the above-mentioned embodiment, the same low frequency is used as the drive frequencies in the respective control modes in the vehicle traveling state. However, the present invention is not limited to this, but different drive frequencies may be set as the drive frequencies in the respective control modes in the vehicle traveling state.

The invention claimed is:

1. A vehicle brake hydraulic pressure controller capable of carrying out a brake hydraulic pressure control in a plurality of control modes depending on a situation of a vehicle, comprising:
    proportional solenoid valves provided in passages connecting a master cylinder and wheel brakes of the vehicle, and configured to be controlled at preset drive frequencies, the drive frequencies being set correspondingly with the control modes such that the drive frequency for the control mode in a vehicle stopping state is higher than the drive frequency for the control mode in a vehicle traveling state;
    a control mode selecting section configured to select, in the case that two or more control modes are requested simultaneously, one of the two or more requested control modes based on a magnitude of a control pressure of each requested control mode; and
    a frequency selecting section configured to select one of the drive frequencies correspondingly with the one of the two or more requested control modes selected by the control mode selecting section,
    wherein the control mode in the vehicle traveling state includes:
        a skid suppression control mode (AYC mode) in which a skidding of the vehicle is detected to be suppressed,
        a traction control mode (TCS mode) in which a racing of at least one wheel is detected to be suppressed, and
        a brake assist control mode (BA mode) in which a braking is assisted by increasing a brake hydraulic pressure upon detection of a sudden braking,
    wherein, in the case that the AYC mode and the TCS mode are requested simultaneously, the control mode selecting section selects either mode having higher control pressure, and
    wherein, in the case that the AYC mode, the TCS mode and the BA mode are requested simultaneously, the control mode selecting section:
        compares a first control pressure obtained by adding the control pressures in the AYC mode and the BA mode with a second control pressure obtained by adding the control pressures in the TCS mode and the BA mode,
        selects, in the case that the first control pressure is higher than the second control pressure, a first control mode in which the BA mode is carried out at the first control pressure, and
        selects, in the case that the first control pressure is equal to or less than the second control pressure, a second control mode in which the BA mode is carried out at the second control pressure.

2. The vehicle brake hydraulic pressure controller of claim 1,
    wherein the control mode in the vehicle stopping state includes a first vehicle-stop holding mode requested on an uphill road and a second vehicle-stop holding mode requested during an engine idling stop, and
    wherein the drive frequency in the second vehicle-stop holding mode is set higher than that in the first vehicle-stop holding mode.

3. The vehicle brake hydraulic pressure controller of claim 2,
    wherein, in the case that the first vehicle-stop holding mode and the second vehicle-stop holding mode are requested simultaneously, the control mode selecting section selects either mode having higher control pressure.

4. The vehicle brake hydraulic pressure controller of claim 1,
    wherein the control section includes the control mode selecting section, a hydraulic pressure controlling section, a valve drive section, a motor drive section and a storage section.

5. The vehicle brake hydraulic pressure controller of claim 4,
    wherein the control mode selecting section judges which one of plural control modes is requested, wherein the plural control modes comprises:
        a hill-start assist mode (HSA mode) requested on an uphill road as a first vehicle-stop holding mode,
        a creep aid system mode (CAS mode) requested during an engine idling stop as a second vehicle-stop holding mode,
        the AYC mode in which skidding of the vehicle is detected to be suppressed,
        the TCS mode in which racing of at least one wheel is detected to be suppressed, and
        the BA mode in which sudden braking is detected and the braking is assisted by increasing brake hydraulic pressure.

6. The vehicle brake hydraulic pressure controller of claim 5,
    wherein the two or more control modes having higher control pressure is always selected such that both control requests of the two or more control modes are satisfied.

7. The vehicle brake hydraulic pressure controller of claim 5,
    wherein in case that it is judged that the AYC mode, the TCS mode and the BA mode are requested simultaneously, the control mode selecting section calculates the first control pressure by adding respective control pressures in the AYC mode and the BA mode, and calculates the second control pressure by adding respective control pressures in the TCS mode and the BA mode and the control mode selecting section compares the calculated first control pressure with the calculated second control pressure.

8. The vehicle brake hydraulic pressure controller of claim 5,
    wherein the valve drive section includes a control valve unit drive section which controls an inlet valve and outlet valve on a basis of pressure raising, holding or reducing instructions of the hydraulic pressure controlling section.

9. The vehicle brake hydraulic pressure controller of claim 8,
wherein in case that a pressure in a wheel cylinder is raised, no current is applied to the inlet valve and the outlet valve,
wherein in case that the pressure in the wheel cylinder is reduced, signals are transmitted to both the inlet valve and the outlet valve to close the inlet valve and to open the outlet valve, thereby discharging brake fluid of the wheel cylinder through the outlet valve, and
wherein in case that the pressure in the wheel cylinder is held, a signal is transmitted to the inlet valve and no current is applied to the outlet valve, thereby closing both the inlet valve and the outlet valve.

10. The vehicle brake hydraulic pressure controller of claim 5,
wherein the control section first judges whether at least one of the BA mode, the AYC mode and the TCS mode is requested,
wherein in case that it is judged that at least one of the BA mode, the AYC mode and the TCS mode in the vehicle traveling state is requested, the control section judges whether the BA mode is requested, and
wherein in case that it is judged that the BA mode is requested, the control section further judges whether at least one of the AYC mode and the TCS mode is requested.

11. The vehicle brake hydraulic pressure controller of claim 10,
wherein in case that it is judged that at least one of the AYC mode and the TCS mode is requested, the control section selects the AYC+BA mode or the TCS+BA mode, whichever has higher control pressure and selects a drive frequency corresponding to the selected control mode from a table.

12. The vehicle brake hydraulic pressure controller of claim 10,
wherein in case that one of the AYC mode and the TCS mode is requested in addition to the BA mode, the control pressure in the control mode not requested becomes zero.

13. The vehicle brake hydraulic pressure controller of claim 10,
wherein in case that it is judged that neither the AYC mode nor the TCS mode is requested, the control section selects the BA mode and selects a drive frequency corresponding to the selected BA mode from a table.

14. The vehicle brake hydraulic pressure controller of claim 10,
wherein in case that it is judged that the BA mode is not requested, the control section selects the AYC mode or the TCS mode, whichever has higher control pressure and selects a drive frequency corresponding to the selected control mode from a table.

15. The vehicle brake hydraulic pressure controller of claim 10,
wherein in case that one of the AYC mode and the TCS mode is requested, the control pressure in the control mode not requested becomes zero.

16. The vehicle brake hydraulic pressure controller of claim 10,
wherein in case that it is judged that none of the respective control modes in the vehicle traveling state is requested, the control section judges whether at least one of the HSA mode and the CAS mode is requested, and when it is judged that at least one of the HSA mode and the CAS mode is, the control section selects the HSA mode or the CAS mode, whichever has higher control pressure and selects the drive frequency corresponding to the selected control mode from a table.

17. The vehicle brake hydraulic pressure controller of claim 16,
wherein in case that one of the HSA mode and the CAS mode is requested, the control pressure in the control mode not requested becomes zero.

18. The vehicle brake hydraulic pressure controller of claim 16,
wherein in case that the HSA mode is selected, intermediate frequency is selected as the drive frequency, and
wherein in case that the CAS mode is selected, high frequency is selected as the drive frequency.

19. The vehicle brake hydraulic pressure controller of claim 1, wherein to judge whether the AYC mode is requested, after values of respective sensors are read:
a target yaw rate is calculated on a basis of steering angle and vehicle speed calculated from wheel speeds;
the target yaw rate is calculated so as to be equivalent to a yaw rate obtained at a time of neutral steering;
on a basis of actual lateral acceleration detected by a lateral acceleration sensor, the target yaw rate is converted into a revised target yaw rate in which a yaw rate value corresponding to the lateral acceleration is used as an upper limit value;
a difference in yaw rate deviation between the revised target yaw rate and the actual yaw rate detected by the yaw rate sensor is calculated, wherein the yaw rate deviation represents the difference between steering operation and actual behavior of the vehicle; and
in a case that the yaw rate deviation is more than a predetermined threshold value and that the vehicle speed is equal to or more than a third threshold value, it is judged that the vehicle is in a skidding state and that the AYC mode is requested.

20. The vehicle brake hydraulic pressure controller of claim 19, wherein:
to judge whether the TCS mode is requested, a judgment may be made as to whether the racing of at least one wheel has occurred by judging whether a difference between left and right wheel speeds is equal to or more than a fourth threshold value on a basis of information from wheel speed sensors; and
to judge whether the BA mode is requested, on the basis of the information from the wheel speed sensors and the pressure sensor, judgments are made as to whether the vehicle speed is equal to or more than a fifth threshold value, whether the variation of master cylinder pressure is equal to or more than a sixth threshold value, and whether the master cylinder pressure is in a predetermined range.

* * * * *